(12) United States Patent
Myogi et al.

(10) Patent No.: US 12,305,314 B2
(45) Date of Patent: May 20, 2025

(54) LOOM

(71) Applicant: TSUDAKOMA KOGYO KABUSHIKI KAISHA, Ishikawa-ken (JP)

(72) Inventors: Keiichi Myogi, Ishikawa-ken (JP); Koichi Tamura, Ishikawa-ken (JP); Tomoya Hayashi, Ishikawa-ken (JP)

(73) Assignee: TSUDAKOMA KOGYO KABUSHIKI KAISHA, Ishikawa-Ken (JP)

( * ) Notice: Subject to any disclaimer, the term of this patent is extended or adjusted under 35 U.S.C. 154(b) by 75 days.

(21) Appl. No.: 17/952,873

(22) Filed: Sep. 26, 2022

(65) Prior Publication Data

US 2023/0112881 A1 Apr. 13, 2023

(30) Foreign Application Priority Data

Oct. 11, 2021 (JP) .................. 2021-166982

(51) Int. Cl.
*D03D 51/02* (2006.01)
*D03D 49/02* (2006.01)
(Continued)

(52) U.S. Cl.
CPC ............. *D03D 51/02* (2013.01); *D03D 49/02* (2013.01); *F16C 19/06* (2013.01); *F16C 3/02* (2013.01); *F16C 2340/00* (2013.01)

(58) Field of Classification Search
CPC ........ D03D 51/02; D03D 49/02; D03D 49/60; D03D 49/027; F16C 19/06; F16C 3/02; F16C 2340/00
See application file for complete search history.

(56) References Cited

U.S. PATENT DOCUMENTS

| 501,585 A | * | 7/1893 | Young | D03D 27/08 |
| | | | | 139/26 |
| 1,054,537 A | * | 2/1913 | Grosslaub | D03D 41/00 |
| | | | | 139/445 |

(Continued)

FOREIGN PATENT DOCUMENTS

| DE | 2417809 A1 | 11/1974 |
| EP | 0268762 A1 | 6/1988 |

(Continued)

OTHER PUBLICATIONS

Feb. 23, 2023, European Search Report issued for related EP Application No. 22198606.0.

*Primary Examiner* — Robert H Muromoto, Jr.
(74) *Attorney, Agent, or Firm* — Paratus Law Group, PLLC (57) ABSTRACT

A loom includes a rotary shaft bridged to a pair of side frames with being supported via bearings each provided in corresponding one of the side frames, the rotary shaft includes: solid shaft-shaped shaft parts supported by corresponding one of the side frames; and a hollow pipe-shaped main body part located between the shaft parts. The loom includes a bearing structure provided in at least one of existence ranges of the shaft parts between the side frames with respect to an axis line direction of the rotary shaft. The bearing structure includes: a rolling bearing into which one of the shaft parts is fitted; and a support body configured to support the rolling bearing.

1 Claim, 3 Drawing Sheets

(51) Int. Cl.
*F16C 19/06* (2006.01)
*D03D 49/00* (2006.01)
*F16C 3/02* (2006.01)

(56) References Cited

U.S. PATENT DOCUMENTS

| | | | | | |
|---|---|---|---|---|---|
| 1,593,851 | A * | 7/1926 | Ryon | | D03D 27/08 139/26 |
| 2,095,544 | A * | 10/1937 | Egli | | D03C 1/144 139/84 |
| 2,493,570 | A * | 1/1950 | Butin | | D03D 45/34 139/239 |
| 3,106,848 | A * | 10/1963 | Brewer | | D03C 7/06 74/110 |
| 3,224,468 | A * | 12/1965 | Zerbee | | D03D 41/00 140/3 R |
| 3,315,709 | A * | 4/1967 | Svaty | | D03D 47/00 139/438 |
| 3,339,589 | A * | 9/1967 | Gotz | | D03D 49/60 139/26 |
| 3,346,017 | A * | 10/1967 | Fend | | D03D 47/26 139/436 |
| 3,352,329 | A * | 11/1967 | Koch | | D03C 9/0633 139/92 |
| 3,429,344 | A * | 2/1969 | Bilek | | D03D 47/00 139/144 |
| 3,498,336 | A * | 3/1970 | Fend | | D03D 47/26 139/436 |
| 3,939,876 | A * | 2/1976 | Robert | | D03D 27/08 139/26 |
| 4,406,308 | A * | 9/1983 | Corain | | D03D 39/226 139/27 |
| 6,145,176 | A * | 11/2000 | Egnaczak | | D04H 18/00 28/115 |
| 9,758,906 | B2 * | 9/2017 | Miller | | D03D 15/69 |
| 11,179,534 | B2 * | 11/2021 | Henry | | A61M 16/16 |
| 11,591,725 | B2 * | 2/2023 | Myogi | | F16H 21/20 |
| 11,608,574 | B2 * | 3/2023 | Myogi | | D03D 49/025 |
| 11,649,573 | B2 * | 5/2023 | Myogi | | D03D 49/027 139/93 |
| 2021/0332508 | A1 * | 10/2021 | Myogi | | D03D 49/02 |
| 2022/0098765 | A1 * | 3/2022 | Myogi | | D03C 9/0608 |
| 2022/0119994 | A1 * | 4/2022 | Oyama | | D03J 1/223 |
| 2022/0127763 | A1 * | 4/2022 | Myogi | | D03D 49/025 |
| 2022/0162781 | A1 * | 5/2022 | Myogi | | F16H 21/20 |
| 2022/0356612 | A1 * | 11/2022 | Myogi | | D03D 51/02 |
| 2022/0356613 | A1 * | 11/2022 | Myogi | | D03D 49/02 |
| 2023/0112881 | A1 * | 4/2023 | Myogi | | D03D 49/02 139/1 R |

FOREIGN PATENT DOCUMENTS

| | | |
|---|---|---|
| JP | S60-151345 A | 8/1985 |
| JP | H07-026374 Y2 | 6/1995 |
| JP | 2006-291380 A | 10/2006 |

* cited by examiner

LOOM

CROSS-REFERENCE TO RELATED APPLICATION(S)

This application is based on and claims priority under 35 USC 119 from Japanese Patent Application No. 2021-166982 filed on Oct. 11, 2021, the contents of which are incorporated herein by reference.

TECHNICAL FIELD

The present invention relates to a loom including a rotary shaft bridged to a pair of side frames with being supported via bearings each provided in each of the side frames where the rotary shaft has solid shaft-shaped shaft parts supported by the respective side frames and a hollow pipe-shaped main body part located between both the shaft parts.

BACKGROUND ART

In a loom, a main shaft, which is a rotary shaft, is provided in a form of being bridged to a pair of side frames of a loom frame. Note that, the main shaft is supported by each side frame, for example, in such a form that support shafts supported via bearings in the side frames are provided to protrude toward an inner side of the loom frame and the main shaft is connected to the support shafts and is thus supported by the side frames via the support shafts and the bearings. In addition, as the main shaft, there is a main shaft formed to be solid as a whole. However, for the purpose of weight saving, a main shaft is also known in which a main body part, which is a main part occupying most of the main shaft, is formed as a hollow pipe-shaped member and shaft parts, which are parts at both ends other than the main body part, are formed as solid shaft-shaped members.

Further, as the rotary shaft that is bridged to the side frames of the loom, there is a shedding shaft in a crank-type shedding device, for example, in addition to the main shaft as described above. As for the shedding shaft, there is a shedding shaft having a hollow main body part and a solid shaft part, like the main shaft described above.

Note that, the configuration of the loom having the rotary shaft such as the main shaft and the shedding shaft described above is disclosed in, for example, PTL 1 and PTL 2. PTL 1 discloses a main shaft provided on a loom, and the main shaft is supported at both end portions thereof by each side frame (loom frame). In addition, the loom disclosed in PTL 1 includes a shaft support device (intermediate receiving member) provided so as to support the main shaft even at an intermediate position thereof. The shaft support device includes a bearing, and is configured to support the main shaft via the bearing. Further, PTL 2 discloses a shedding shaft provided on a loom, and the loom disclosed in PTL 2 also has a shaft support device configured to support the shedding shaft at an intermediate position thereof, as is the case with the loom disclosed in PTL 1.

CITATION LIST

Patent Literature

PTL 1: JP2006-291380A
PTL 2: JPH07-026374Y

In the meantime, the shaft support device described above is provided so as to support the rotary shaft at the intermediate position thereof, as described above. Therefore, in a case where the rotary shaft is configured to include the hollow main body part as described above, the shaft support device is provided in a form of supporting the main body part. In this case, since the main body part is a hollow pipe-shaped member as described above, the shaft support device generally adopts a slide bearing (bearing metal), as the bearing. In the shaft support device using such a slide bearing, there is usually a slight gap between the slide bearing and the rotary shaft.

Note that, in the loom, the entire loom frame including the side frames configured to support the rotary shaft vibrates due to a beating motion, a shedding motion, and the like during an operation (during weaving). The rotary shaft also vibrates due to the vibration. Therefore, the shaft support device described above is provided for the purpose of suppressing the vibration of the rotary shaft. However, in the shaft support device, since there is a gap between the slide bearing and the rotary shaft, as described above, the rotary shaft vibrates within a range of the gap.

Further, in the loom, a resonance phenomenon occurs in which the rotary shaft resonates in relation to a number of rotations of the loom during the operation, which may cause the rotary shaft to vibrate more violently. More specifically, as described above, the loom frame vibrates as a whole during the operation. However, the vibration corresponds to the number of rotations of the loom. In relation to the vibration of the loom frame corresponding to the number of rotations and a natural frequency of a system of the rotary shaft including a part configured to support the rotary shaft, the resonance phenomenon described above may occur and the rotary shaft may vibrate violently.

However, regarding the natural frequency of the system of the rotary shaft, although the shaft support device is provided at the intermediate position with respect to the rotary shaft, as described above, the gap as described above exists between the bearing and the rotary shaft, so that the rotary shaft is substantially supported only at the support parts of both ends supported by the side frames. Therefore, the natural frequency of the system of the rotary shaft including such support parts is not affected by the existence of the shaft support device (the natural frequency is the same as that of a case where the shaft support device is not provided).

As the loom frame (side frames) vibrates as described above, in addition to the vibration of the rotary shaft, when the resonance phenomenon occurs, the vibration of the rotary shaft is increased and becomes even more intense. As a result, a problem may occur in which the rotary shaft and the bearing provided in the side frame for supporting the rotary shaft are damaged.

SUMMARY

In view of the above situations, an object of the present invention is to provide a configuration by which it is possible to suppress, in a loom including a rotary shaft having the hollow main body part and the solid shaft parts as described above, vibration of the rotary shaft as much as possible.

A preamble of the present invention is a loom including a rotary shaft bridged to a pair of side frames with being supported via bearings each provided in corresponding one of the side frames, the rotary shaft includes: solid shaft-shaped shaft parts supported by corresponding one of the side frames; and a hollow pipe-shaped main body part located between the shaft parts.

In addition, in order to achieve the above object, the loom according to the present invention includes a bearing structure that is provided in at least one of existence ranges of the shaft parts between the side frames with respect to an axis line direction of the rotary shaft, the bearing structure includes: a rolling bearing into which one of the shaft parts is fitted; and a support body configured to support the rolling bearing.

According to the loom of the present invention, the rotary shaft is in a state of being supported by the bearing structure adopting, as a bearing, the rolling bearing externally fitted (fitted without a gap) to the solid shaft part of the rotary shaft, in addition to being supported at both ends by the side frames. Therefore, a system of the rotary shaft also includes the bearing structure. Further, in the present invention, the bearing structure may be fitted to the shaft part (the bearing structure may be provided within the existence range of the shaft part), and a position thereof can be arbitrarily set within the existence range of the shaft part. A natural frequency of the system of the rotary shaft changes according to the position of the bearing structure. In other words, the position of the bearing structure determines the natural frequency of the system of the rotary shaft.

Note that, in manufacturing and selling a loom, operating conditions of the loom, including a number of rotations, are provided in advance from a user, and are generally perceived before designing the loom. Therefore, it is possible to obtain a natural frequency at which the resonance phenomenon occurs in the system of the rotary shaft, based on the perceived operating conditions of the loom. Further, in the loom of the present invention, the position of the bearing structure can be arbitrarily set within the existence range of the shaft part on the rotary shaft, as described above. Therefore, considering the obtained natural frequency at which the resonance phenomenon occurs, it is possible to set the position of the bearing structure so that the natural frequency of the system of the rotary shaft does not match the obtained natural frequency. By setting the position of the bearing structure in this way, it is possible to prevent the resonance phenomenon from occurring during weaving, and to prevent damage to the rotary shaft and the bearing, which is caused due to violent vibration of the rotary shaft.

DESCRIPTION OF EMBODIMENTS

Figure 1:
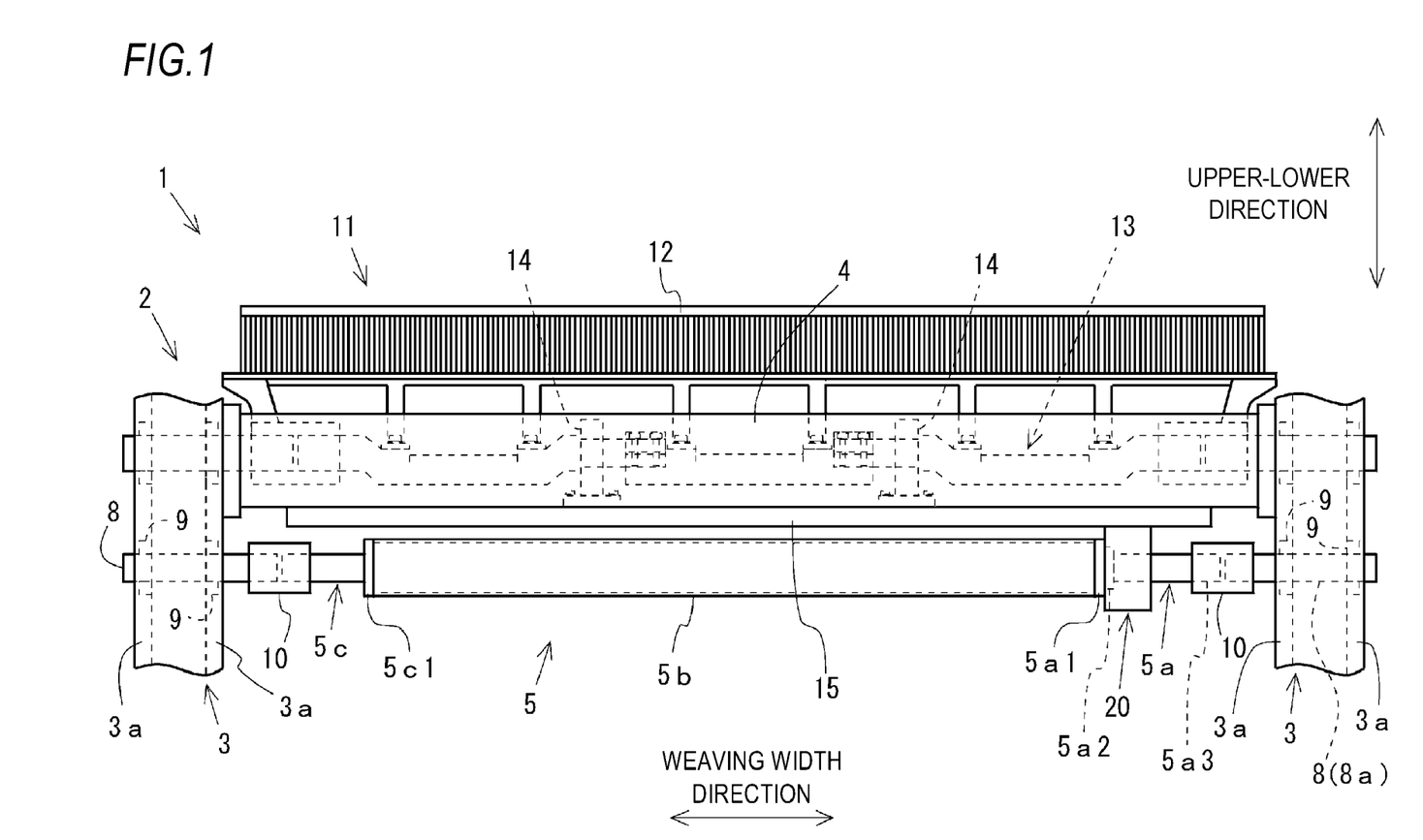
FIG. 1 is a schematic front view of a loom showing an example of the loom that is a preamble of the present invention.

Hereinafter, an embodiment of the loom of the present invention will be described with reference to FIGS. 1 to 3.

In a loom 1, a frame 2 has a pair of side frames 3 and 3, as a main body, and both the side frames 3 and 3 are connected by a plurality of beam members. Note that, each side frame 3 is formed in a housing shape having a space inside. Both the side frames 3 and 3 are connected by the plurality of beam members, as described above, in a state of facing in a width direction (weaving width direction of the loom 1). In addition, regarding the beam member, the beam member 4 shown in FIGS. 1 to 3 is a so-called front top stay, and is provided at a position higher than a winding roll (not shown) with respect to an upper-lower direction, on the winding roll side in a front-rear direction of the loom 1.

Further, in the loom 1, a main shaft 5 is provided in a form of being bridged to the pair of side frames 3 and 3 described above. The main shaft 5 has solid shaft-shaped shaft parts 5a and 5c each supported by each side frame 3 and a hollow pipe-shaped main body part 5b located between both the shaft parts 5a and 5c. In this way, the loom 1 includes the main shaft 5 as the rotary shaft referred to in the present invention. Note that, in each of the shaft parts 5a and 5c of the main shaft 5, end portions 5a1 and 5c1 on the main body part 5b side are formed so as to be flange-shaped portions (flange portions) each having a diameter larger than a diameter of a portion other than the end portions 5a1 and 5c1, in conformity to an outer diameter of the main body part 5b. The main shaft 5 is provided so as to be located in the vicinity of an opposite side to the winding roll side with respect to the front top stay 4 in the front-rear direction and below the front top stay 4 in the upper-lower direction.

Note that, in the present embodiment, the main shaft 5 is connected to support shafts 8 each supported by each side frame 3, via coupling members 10 and are thus in a state of being bridged to the side frames 3 and 3, as described above. Therefore, each side frame 3 is provided with the support shaft 8 at a position aligned with the position of the main shaft 5 in the front-rear direction and the upper-lower direction.

The support shaft 8 has a shaft shape longer than a dimension of the side frame 3 in the weaving width direction, and is provided so as to protrude from the side frame 3 toward an inner side of the loom 1 in each side frame 3. However, the support shaft 8 is supported by both sidewalls 3a and 3a of the side frame 3 via bearings 9, and is provided so as to be rotatable with respect to the side frame 3.

Incidentally, the loom 1 includes a drive mechanism (not shown) including a driving motor as a drive source. In addition, the drive mechanism is provided on one side frame 3 side of the pair of side frames 3 and 3. Further, in the present embodiment, it is assumed that the drive mechanism is provided on the right side frame 3 side in FIG. 1. The support shaft 8 (one support shaft 8a) supported by the right side frame 3 is connected to the drive mechanism and is rotationally driven, whereby the main shaft 5 is rotationally driven.

In addition, the loom 1 includes a beating device 11 including a rocking shaft 13 for swingably driving a reed 12. The rocking shaft 13 is provided in a form of being bridged to both the side frames 3 and 3, as is the case with the main shaft 5. In addition, the rocking shaft 13 is provided so as to be located at substantially the same position as the position of the main shaft 5 in the front-rear direction and above the main shaft 5 in the upper-lower direction. Further, the rocking shaft 13 is supported by a shaft support device 14 even at an intermediate position between both the side frames 3 and 3, in a state of being bridged to both the side frames 3 and 3 as described above.

Note that, in the shown example, the shaft support device 14 is provided in two so as to support the rocking shaft 13 at two places between both end portions thereof. Each of the shaft support devices 14 is supported by a support plate 15 fixed to the front top stay 4. More specifically, the support plate 15 is fixed to a lower surface of the front top stay 4, and is provided in a form of existing over substantially an entire length of the front top stay 4 in the weaving width direction and existing from the front top stay 4 to the rocking shaft 13 (main shaft 5) in the front-rear direction. Each shaft support device 14 is attached (supported) to the support plate 15 in a state of being placed on an upper surface of the support plate 15.

In the loom 1 as described above, in the present invention, the loom includes a bearing structure that is provided in at least one of existence ranges of both the shaft parts of the rotary shaft between the side frames 3 and 3 with respect to an axis line direction of the rotary shaft. In addition, the bearing structure includes a rolling bearing into which the shaft part of the rotary shaft is fitted and a support body configured to support the rolling bearing. Further, it is assumed that the bearing structure 20 of the present embodiment is provided so as to support the main shaft 5 that is the rotary shaft. Further, it is assumed that the bearing structure 20 is provided so as to support the shaft part (one shaft part) 5a, which is connected to the one support shaft 8a (support part 8 on the side frame 3 side on the driving side), of both the shaft parts 5a and 5c of the main shaft 5. Such a bearing structure 20 of the present embodiment will be described in detail below.

Figure 2:
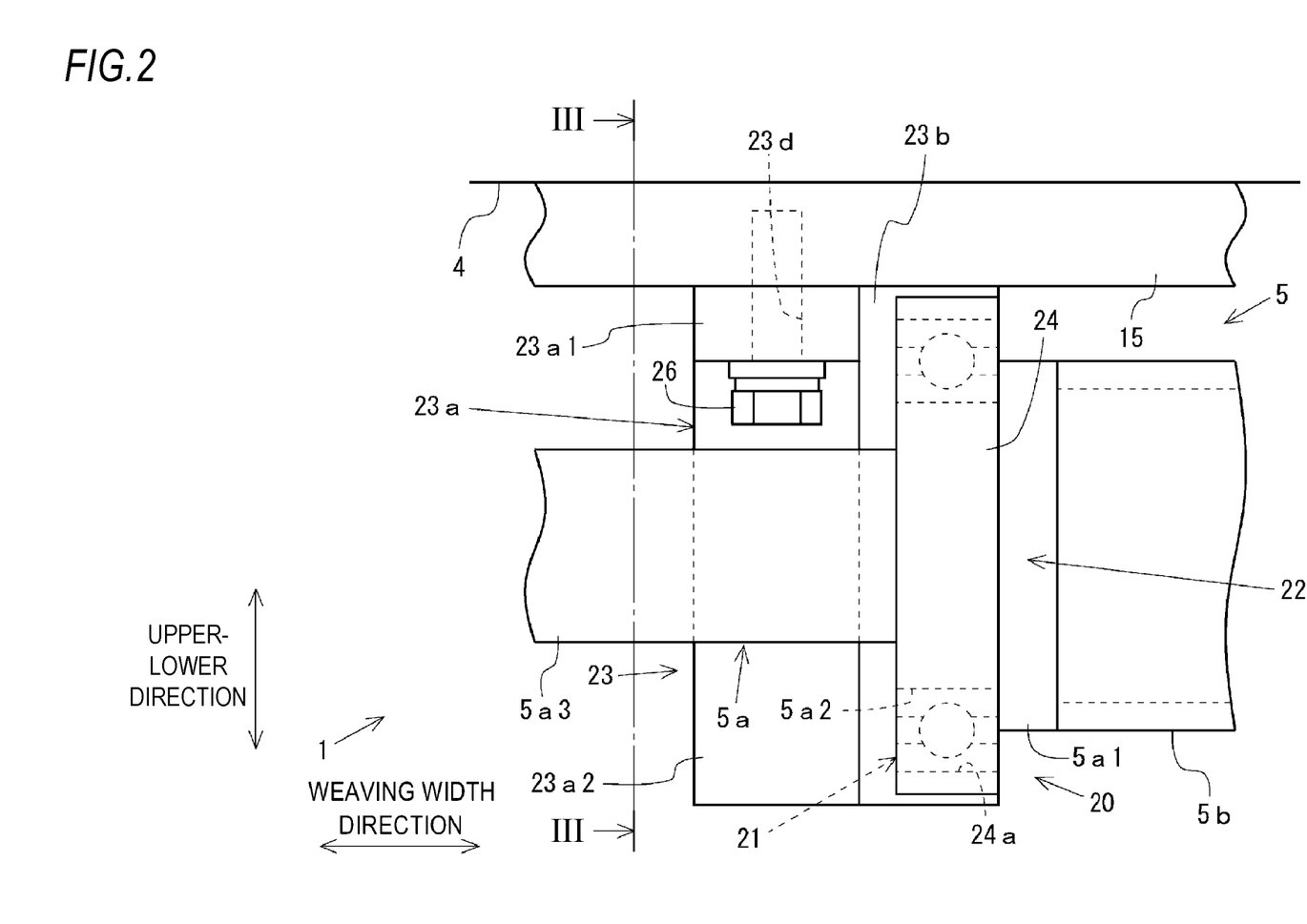
FIG. 2 is a front view of a bearing structure showing an example of the bearing structure provided to the loom according to the present invention.
Figure 3:
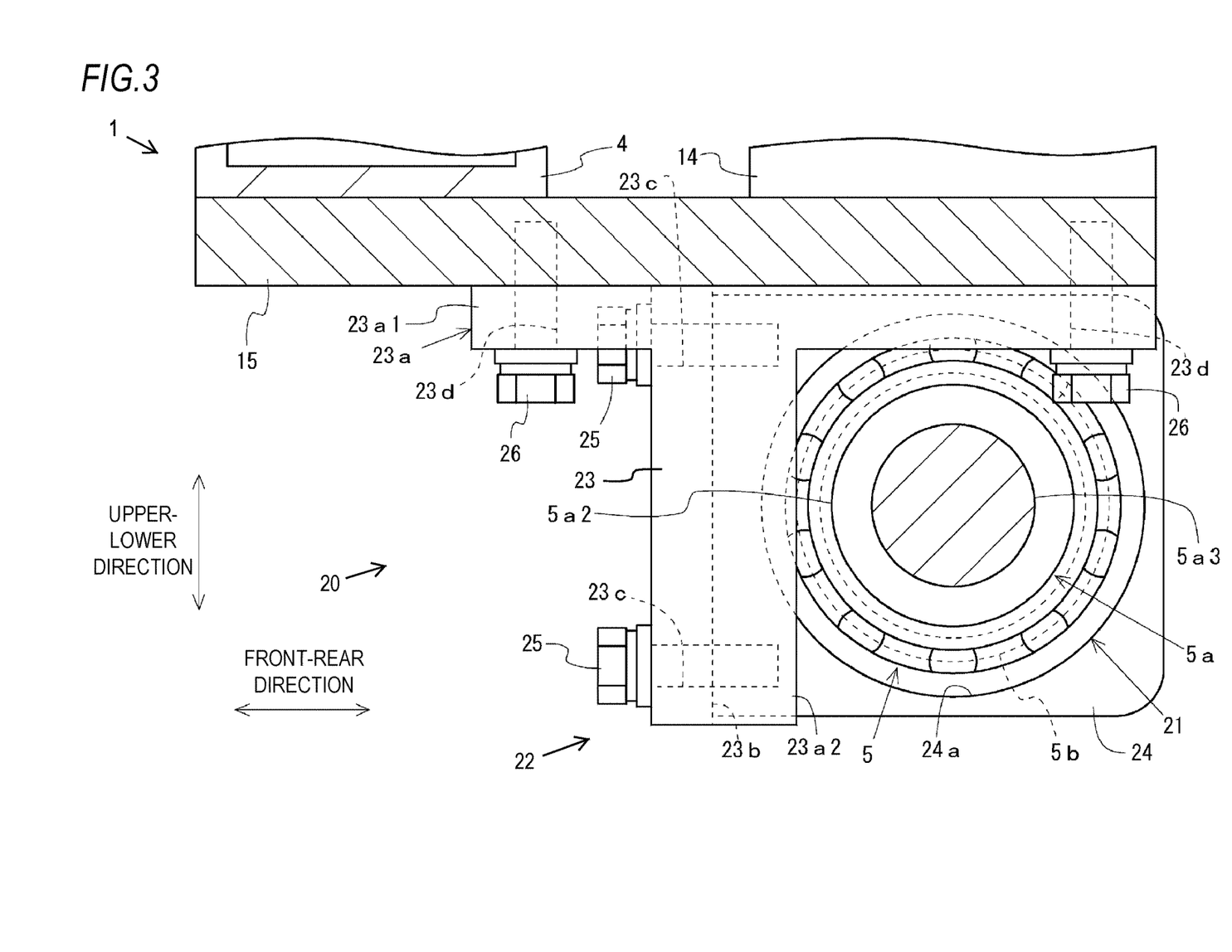
FIG. 3 is a cross-sectional view taken along a III-III line of the loom shown in FIG. 2 (a side view of the bearing structure).

As shown in FIGS. 2 and 3, the bearing structure 20 has a rolling bearing 21 into which the one shaft part 5a is fitted and a support body 22 configured to support the rolling bearing 21. Further, the support body 22 has a holding part 24 configured to hold the rolling bearing 21, and a support part 23 for making the holding part 24 supported with respect to the support plate 15.

As for the support body 22, the holding part 24 is a member having a plate shape and a substantially square-shaped end face. However, the holding part 24 is formed with a through-hole 24a penetrating in a plate thickness direction so that the rolling bearing 21 is fitted in the plate thickness direction. In addition, the support part 23 has an attaching portion 23a that is a portion to be attached to the support plate 15 and an attached portion 23b that is a portion to which the holding part 24 is attached, and the attaching portion 23a and the attached portion 23b are integrally formed.

As for the support part 23, the attaching portion 23a has a plate shape and is formed so as to form a substantial T-shape, as seen in a plate thickness direction thereof. Specifically, the attaching portion 23a has a base portion 23a1 that is a portion attached to the support plate 15 and an extension portion 23a2 that is a portion provided so as to extend in a direction orthogonal to the base portion 23a1.

More specifically, the base portion 23a1 is formed so as to form a cuboid shape. However, four sides of the base portion 23a1 form a rectangular shape where a length of a long side is sufficiently longer than a length of a short side. The base portion 23a1 is formed with through-holes 23d provided for inserting a screw member 26 for attaching the attaching portion 23a (support part 23) to the support plate 15 and formed at each of both end portions of the base portion 23a1 in a direction (longitudinal direction) of the long side. Note that, each of the through-holes 23d is formed so as to be opened to two parallel side surfaces of the base portion 23a1 and to penetrate in a direction orthogonal to both the side surfaces. One of both the side surfaces to which the through-holes 23d are opened becomes an attaching surface that is in contact with the support plate 15 when attached to the support plate 15.

In addition, the extension portion 23a2 is formed so as to form a cuboid shape, as is the case with the base portion 23a1. The extension portion 23a2 is formed to extend in parallel to a penetration direction of the through-hole 23d from a side surface opposite to the attaching surface, at a substantially central portion (portion between both the end portions) of the base portion 23a1 in the longitudinal direction. Further, a length of the extension portion 23a2 in the extension direction is formed so that a sum with a dimension of the base portion 23a1 in the penetration direction of the through-hole 23d (extension direction of the extension portion 23a2) is substantially the same as a length of the long side of the side surfaces of the holding part 24.

In addition, the attached portion 23b has a plate shape and is formed so that an end face has a rectangular shape. The attached portion 23b is formed so that the end surface thereof is parallel to the extension direction of the extension portion 23a2 and parallel to the plate thickness direction of the attaching portion 23a. However, a position of the attached portion 23b in the longitudinal direction is such a position that the attached portion 23b exists within an existence range of the extension portion 23a2. Further, the attached portion 23b has substantially the same dimension as the attaching portion 23a with respect to the extension direction, and is formed so as to exist over the existence range of the attaching portion 23a. Note that, the dimension of the attached portion 23b in the plate thickness direction of the attaching portion 23a is slightly greater than a plate thickness of the holding part 24. Further, the attached portion 23b is formed with two through-holes 23c that are provided for inserting screw members 25 for attaching the holding part 24, formed to penetrate in the plate thickness direction and spaced at an interval in the extension direction.

In the support body 22 having the holding part 24 and the support part 23 as described above, the rolling bearing 21 is fitted in the holding part 24 (through-hole 24a). In addition, the holding part 24 is attached to the attached portion 23b of the support part 23 in such a form that the plate thickness direction thereof is made to match the plate thickness direction of the attaching portion 23a of the support part 23. Further, the attaching is performed in such a form that the screw member 25 inserted into each through-hole 23c of the attached portion 23b is screwed into the holding part 24.

In a state (attached state) where the holding part 24 is attached to the support part 23 as such, the holding part 24 is in a state where the position thereof is aligned with the position of the attached portion 23b in the extension direction. Further, in the attached state, an inner ring of the rolling bearing 21 fitted to the holding part 24 is exposed as a whole (state where the inner ring does not overlap the attaching portion 23a), as seen in the plate thickness direction of the attaching portion 23a. In other words, in the support part 23, the dimension of the base portion 23a1 in the extension direction and the position of the attached portion 23b with respect to the extension portion 23a2 in the longitudinal direction are such that the exposed state of the inner ring of the rolling bearing 21 can be implemented as such.

Further, in the attached state, a dimension from the attaching surface of the base portion 23a1 of the support part 23 to a position of a center of the rolling bearing 21 (inner ring) with respect to the extension direction is such a dimension that matches a distance from a shaft center of the main shaft 5 in a bridged state in the loom 1 to the support plate 15. More specifically, in the loom 1, the main shaft 5 is bridged to the side frames 3 and 3 in a state of being connected to the support shafts 8 as described above, and the position thereof is such a position that a shaft center thereof matches shaft centers of the support shafts 8. Therefore, the support part 23 is formed so that a dimension from the attaching surface to the center position of the rolling bearing 21 with respect to the extension direction matches a distance from the shaft center of the support shaft 8 to the support plate 15 in the upper-lower direction on the loom 1.

The one shaft part 5a of the main shaft 5 is fitted into the rolling bearing 21 fitted to the holding part 24 of the support body 22 configured as described above. In addition, in a state where the one shaft part 5a is fitted into the rolling bearing 21 in this way, the flange portion 5a1 of the shaft part 5a and the rolling bearing 21 are in contact with each other.

Note that, in general, it is regarded that the larger a diameter of a rolling bearing is, the stronger a load in an axial line direction and a radial direction is and the more effective it is to suppress vibration of the support shaft. Therefore, also in the present embodiment, in order to adopt a larger rolling bearing for further suppressing vibration of the main shaft 5, the one shaft part 5a is formed so that a portion (fitting portion) 5a2 adjacent to the flange portion 5a1 as a portion fitted into the rolling bearing 21 is formed to have a diameter larger than a diameter of a portion 5a3 on a tip end side (portion connected to the support shaft 8a by the coupling member 10).

The support body 22 is attached to the lower surface of the support plate 15 at the attaching portion 23a of the support part 23 at a position (attaching position) in the weaving width direction, which will be described later. That is, the bearing structure 20 including the support body 22 and the rolling bearing 21 into which the one shaft part 5a of the main shaft 5 is fitted as described above is attached to the lower surface of the support plate 15 at the attaching position. Note that, the attaching is performed in such a form that the screw member 26 inserted into each through-hole 23d of the base portion 23a1 of the attaching portion 23a is screwed into the support plate 15.

The bearing structure 20 is attached to the support plate 15 in this way, so that the main shaft 5 is in a state of being supported by the bearing structure 20 at the attaching position. In addition, the main shaft 5 is connected to the support shafts 8, which are supported by the respective side frames 3 as described above, at the shaft parts 5a and 5c via the coupling members 10, and are thus bridged to the pair of side frames 3 and 3. Thereby, the main shaft 5 is supported by the side frames 3 at both end portions thereof (end portions of the shaft parts 5a and 5c), and is also supported by the bearing structure 20 at the fitting portion 5a2 of the one shaft part Sa between both the end portions.

Note that, regarding the support position (the attaching position) by the bearing structure 20 in the weaving width direction, the attaching position is set to a position where a natural frequency of a system of the main shaft 5 including the bearing structure 20 and a resonance frequency at which a resonance phenomenon of the main shaft 5 occurs are different from each other (are not matched). However, as described above, in the present embodiment, the bearing structure 20 is in a state where the rolling bearing 21 is in contact with the flange portion Sal of the one shaft part 5a in a state where the one shaft part Sa of the main shaft 5 is fitted into the rolling bearing 21. Therefore, the attaching position is determined by a dimension in the axis line direction of each constitutional part of the main shaft 5 (main body part 5b, each shaft part 5a, 5c, flange portion 5a1 of the one shaft part 5a, and the like). Therefore, the main shaft 5 is configured so that the attaching position is a position where the natural frequency of the system and the natural frequency at which the resonance phenomenon occurs are different.

According to the loom 1 configured so that the main shaft 5 is supported by the bearing structure 20 provided in this way, the resonance phenomenon does not occur during weaving. Therefore, the violent vibration of the main shaft 5, which is caused by the resonance phenomenon, does not occur, so that the main shaft 5 and the bearing 9 provided in each side frame 3 for supporting the main shaft 5 are prevented from being damaged due to the violent vibration.

Note that, the bearing structure 20 is provided so as to additionally support the main shaft 5, which is supported at both end portions, between both the end portions thereof, as described above. Therefore, the bearing structure 20 not only prevents the occurrence of the resonance phenomenon (prevents the violent vibration of the main shaft 5 due to the resonance phenomenon) as described above but also exhibits an effect (vibration suppression effect) of suppressing the vibration by the additional support. Further, in the present embodiment, as described above, the fitting portion 5a2 of the shaft part Sa fitted into the rolling bearing 21 of the bearing structure 20 is formed to have the diameter larger than that of the portion 5a3 on the tip end side, and a bearing having a larger diameter is adopted as the rolling bearing 21. Thereby, the configuration is such a configuration that a greater vibration suppression effect can be obtained.

Note that, the present invention is not limited to the above embodiment, and can also be implemented in modified aspects (modified embodiments), as described in following (1) to (6).

(1) As for the support body of the bearing structure, in the above embodiment, the support body 22 has the plate-shaped holding part 24 configured to hold the rolling bearing 21 and the support part 23 for making the plate-shaped holding part 24 supported with respect to the support plate 15, and the support part 23 has the attaching portion 23a and the attached portion 23b. However, in the bearing structure of the present invention, even when the support part has the holding part and the support part, the support part is not limited to the configuration as described in the above embodiment, and may be formed into any shape as long as it can make the holding part supported with respect to the support plate 15.

In addition, in the above embodiment, the support body 22 has such a configuration that the holding part 24 and the support part 23 are formed as separate members, respectively, and both the members are combined. However, even when the support body is configured to include a part corresponding to the holding part and a part corresponding to the support part, the support body is not limited to the configuration where both the parts are separate members, and may be configured such that the holding part and the support part are integrally formed so as to be a single member part.

Note that, in the case where the support body is configured by the single member as such, the support body may also be configured as a plate member bent into an L shape, for example. More specifically, the L-shaped plate member is formed with a through-hole, into which the rolling bearing 21 is fitted, at a part on one end side with respect to the bent portion and the part on the one end side is formed as a part corresponding to the holding part, and a part on the other end side with respect to the bent portion is formed as a part corresponding to the support part that is attached to the support plate 15. Thereby, the plate member can be configured as the support body.

(2) As for the part on the loom to which the bearing structure is attached, in the above embodiment, the support body 22 is attached to the support plate 15 fixed to the front top stay 4, which is one of the plurality of beam members connecting the pair of side frames 3 and 3. However, in the loom of the present invention, the bearing structure is not limited to being provided in the form of being attached to the support plate 15.

For example, even when the support plate is attached to the front top stay 4, the bearing structure may be provided in a form of being directly attached to the front top stay 4, depending on the existence range of the support plate, the position of the bearing structure in the weaving width direction, and the like. Further, when the loom is configured to include an auxiliary frame for connecting the plurality of beam members in the frame, the bearing structure may be provided in a form of being attached to the auxiliary frame.

In addition, the bearing structure may be provided in a form of being attached to the side frame 3. Note that, in this case, the support body (support part) of the bearing structure is configured to have a part that is attached to an inner side surface of the side frame 3, and to extend to a support position of the main shaft by the bearing structure (position where the rolling bearing is arranged) in the weaving width direction in a state of being attached to the side frame 3 at that part.

(3) As for the position of the bearing structure in the weave width direction, in the above embodiment, the bearing structure 20 is provided so as to support the main shaft 5 at the one shaft part 5*a* (shaft part connected to the support shaft 8*a* on the side frame 3 side on the driving side) of the main shaft 5. That is, the bearing structure is provided so as to support the rotary shaft at one of both the shaft parts of the rotary shaft, which is the shaft part on the driving side. However, in the loom of the present invention, the bearing structure is not limited to being provided so as to support the rotary shaft at the shaft part on the driving side, and may be provided so as to support the rotary shaft at the shaft part on an opposite side to the driving side. In addition, the bearing structure is not limited to being provided so as to support the rotary shaft only at one of both the shaft parts of the rotary shaft, and may be provided so as to support the rotary shaft at each of both the shaft parts.

Note that, in any case where the bearing structure is provided so as to support the rotary shaft at the shaft part of the rotary shaft on the opposite side to the driving side or at both the shaft parts, the position of the bearing structure with respect to the shaft part in the weaving width direction is set to a position where the condition (resonance prevention condition) that the natural frequency of the system of the rotary shaft including the bearing structure is different from the natural frequency that causes the resonance phenomenon of the rotary shaft is satisfied.

Further, in the loom, the pair of side frames to which the rotary shaft is bridged has a tendency that the side frame on the driving side vibrates greater than the side frame on the opposite side. Therefore, the rotary shaft also vibrates greater at the end portion, on a side supported by the side frame on the driving side, of both end portions. Therefore, by providing the bearing structure so as to support at least the shaft part on the driving side of both the shaft parts of the rotary shaft, the vibration of the rotary shaft can be more effectively suppressed by the vibration suppression effect of the bearing structure described above.

(4) As for the combined state of the bearing structure and the rotary shaft, in the above embodiment, the bearing structure 20 and the rotary shaft 5 are combined in a state where the rolling bearing 21 of the bearing structure 20 and the flange portion 5*a*1 of the shaft part 5*a* fitted in the rolling bearing 21 are in contact with each other. However, in the present invention, the combined state of both the members are not limited to such a form. That is, the bearing structure and the rotary shaft may be combined with each other such that the rolling bearing and the flange portion of the shaft part are spaced apart from each other (such that the bearing structure supports the rotary shaft at a position spaced from the flange portion of the shaft part). Further, the bearing structure and the rotary shaft may be combined with each other such that the bearing structure supports the rotary shaft at the flange portion of the shaft part (such that the flange portion of the shaft part is fitted into the rolling bearing).

Note that, as described above, the position of the bearing structure in the weaving width direction is set to the position where the resonance prevention condition is satisfied. The factors that determine the natural frequency of the system of the rotary shaft include a support position of the bearing structure with respect to the rotary shaft (at which position on the rotary shaft the bearing structure supports the rotary shaft), a weight of the rotary shaft, which is determined by the dimension in the axis line direction, the diameter and the like of each constitutional part (main body part, shaft part) of the rotary shaft, and the like. Further, as described above, the resonance phenomenon of the rotary shaft (the natural frequency that causes the resonance phenomenon) is also related with the number of rotations of the loom under the operating conditions required by the user.

Therefore, for example, even when the configuration of the main shaft and the support configuration of the main shaft are the same as those of the above embodiment, if the operating conditions of the loom required by the user are significantly different, the position of the bearing structure is different from that of the above embodiment. However, in the present invention, the bearing structure may be provided as such. Further, in the present invention, the configuration of the rotary shaft itself (dimensional relationship of each constitutional part in the axis line direction, and the like) is not particularly limited. Therefore, the rotary shaft may be configured such that the combined state different from that of the above embodiment is made while satisfying the resonance prevention condition.

Further, in the above embodiment, the shaft part 5*a* of the rotary shaft 5 is formed so that the diameter is different between the fitting portion 5*a*2, which is fitted in the rolling bearing 21, of the portion other than the flange portion 5*a*1 and the portion 5*a*3 on the further tip end side than the fitting portion (so that the diameter is larger on the fitting portion 5*a*2 side). However, the shaft part may be formed so that the diameters of both the portions are the same. Note that, in this case, the portion other than the flange portion may be formed to have the same diameter as that of the fitting portion 5*a*2 of the above embodiment as a whole, or may be formed to have the same diameter as that of the portion 5*a*3 on the tip end side.

(5) As for the loom to which the present invention is applied, in the above embodiment, the loom 1 has the configuration where the support shafts 8 are supported by the respective side frames 3 via the bearings 9 and 9 in the side frames 3 and the main shaft 5 as the rotary shaft is connected to each of the support shafts 8, so that the main shaft 5 is bridged to the pair of side frames 3 and 3. However, the loom to which the present invention is applied is not limited to the configuration where the rotary shaft is bridged to the pair of side frames in the form of being indirectly supported by the side frames via the support shafts, and may be configured so that the rotary shaft is directly supported by the side frames and the rotary shaft is bridged to the pair of side frames.

(6) As for the rotary shaft in the present invention, in the above embodiment, the main shaft 5 is used as the rotary shaft referred to in the present invention, and the main shaft 5 and the bearing structure 20 are provided so that the shaft part 5*a* of the main shaft 5 is fitted into the rolling bearing 21 of the bearing structure 20. However, the present invention is not limited to the configuration where the main shaft is used as the rotary shaft. For example, when a shedding device is a crank-type shedding device, a shedding shaft of the shedding device may be used as the rotary shaft. In this case, the bearing structure may be provided in a form of being attached to, for example, a front bottom stay (beam member provided below the front top stay 4), which is one of the plurality of beam members connecting the pair of side frames.

The present invention is not limited to the above embodiment and the modified embodiments, and can be variously changed without departing from the gist of the present invention.

The invention claimed is:

1. A loom including a rotary shaft bridged to a pair of side frames of a loom frame via bearings each provided in corresponding one of the side frames, the rotary shaft including: solid shaft parts, which are solid shaft-shaped shaft parts supported by corresponding one of the side frames; and a hollow pipe-shaped main body part located between the solid shaft parts, the solid shaft parts being each directly attached to each of both end portions of the main body part, respectively, the loom comprising:

a bearing structure provided in at least one of existence ranges of both the solid shaft parts between the side frames with respect to an axis line direction of the rotary shaft and configured to rotatably support the rotary shaft, the bearing structure including: a rolling bearing having an inner ring into which one of the solid shaft parts is fitted; and a support body having a through-hole and configured to hold the rolling bearing in a form of fitting it into the through-hole so as not to be relatively rotatable and attach to the loom frame.

\* \* \* \* \*